(12) United States Patent
Hasegawa et al.

(10) Patent No.: US 6,219,762 B1
(45) Date of Patent: Apr. 17, 2001

(54) METHOD AND APPARATUS FOR ASSIGNING PRIORITY TO UPDATE DATA STORED IN PLURAL STORAGE MEANS

(75) Inventors: Jun Hasegawa, Yokohama; Toshitada Saito, Kawasaki; Masahiro Okada, Urayasu; Toshio Fujisawa, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/892,490

(22) Filed: Jul. 14, 1997

(30) Foreign Application Priority Data

Jul. 16, 1996 (JP) .................................................. 8-186187

(51) Int. Cl.⁷ .................................................. G06F 13/18
(52) U.S. Cl. .............................. 711/151; 711/152; 711/145
(58) Field of Search ........................ 395/182.09; 711/206, 711/207, 162, 148, 152, 163, 151, 150, 146, 145, 156

(56) References Cited

U.S. PATENT DOCUMENTS

| | | | |
|---|---|---|---|
| 4,939,641 | * 7/1990 | Schwartz et al. | 711/146 |
| 4,959,777 | * 9/1990 | Holman, Jr. | 711/141 |
| 5,060,144 | 10/1991 | Sipple et al. . | |
| 5,193,168 | * 3/1993 | Corrigan et al. | 707/100 |
| 5,339,397 | * 8/1994 | Eikill et al. | 711/206 |
| 5,404,489 | * 4/1995 | Woods et al. | 711/152 |
| 5,434,997 | * 7/1995 | Landry et al. | 714/12 |
| 5,495,570 | * 2/1996 | Heugel et al. | 714/11 |
| 5,533,185 | * 7/1996 | Lentz et al. | 345/524 |
| 5,796,605 | * 8/1998 | Hagersten | 364/134 |
| 5,892,766 | 4/1999 | Wicki et al. . | |

FOREIGN PATENT DOCUMENTS

| | | |
|---|---|---|
| 2283839 | 5/1995 | (GB) . |
| 7-191946 | 7/1995 | (JP) . |
| 0 567 355 | 10/1993 | (WO) . |

* cited by examiner

Primary Examiner—B. James Peikari
(74) Attorney, Agent, or Firm—Hogan & Hartson, LLP.

(57) ABSTRACT

A storage means control apparatus of this invention includes a first processing unit for performing write processing in a first storage unit, a second processing unit for performing write processing in a second storage unit, a revealing data control unit for managing revealing data representing storage areas where the first processing unit has performed write processing in the first storage unit (101), another revealing data control unit for managing another revealing data representing storage areas where the second processing unit has performed write processing in the second storage unit, a priority data control unit for managing priority data representing a priority of each of the first and second processing units in units of storage areas of the second storage unit, a inhibition data control unit for managing inhibition data for inhibiting write processing in each storage area of the second storage unit using the priority data and the revealing data, and a processing data reflection unit for writing the data written in the first storage unit (101) in the second storage unit on the basis of the inhibition data. With this arrangement, when each write control unit in a plurality of processing units performs write processing in the storage unit of the self processing unit, matching of stored contents among the units can be ensured.

14 Claims, 15 Drawing Sheets

| A1 | B2 | C3 | D0 |
|----|----|----|----|
| E3 | F2 | G3 | H2 |

| A | B | C | D |
|---|---|---|---|
| E | F | G | H |

FIG. 6

|  |  |  |  |
|---|---|---|---|
| A1 | B2 | C1 | D0 |
| E2 | F1 | G0 | H2 |

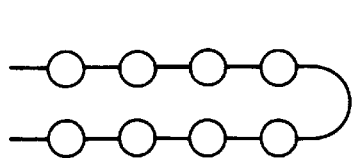

ONE-DIMENSIONAL
ARRAY NETWORK
d=2, DM=N−1

FIG. 16A

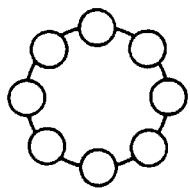

RING NETWORK
d=2, DM=[N/2]

FIG. 16B

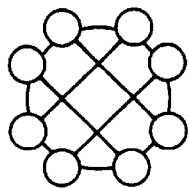

CHORDAL RING NETWORK
(THREE-DIMENSIONAL)
d = 3

FIG. 16C

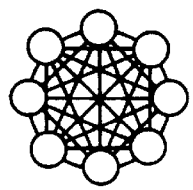

COMPLETE NETWORK
d=N−1, DM=1

FIG. 16D

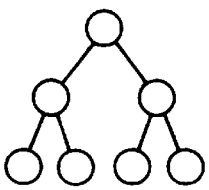

BINARY TREE NETWORK
d=3, DM=2([$\log_2 N$]−1)

FIG. 16E

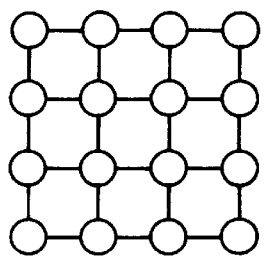

TWO-DIMENSIONAL
MESH NETWORK
d=4, DM=2($\sqrt{N}$−1)

FIG. 16F

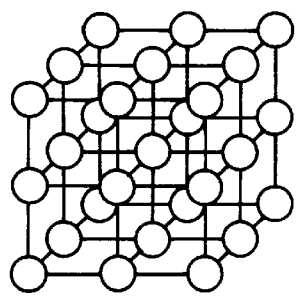

THREE-DIMENSIONAL
MESH NETWORK
d=6, DM=3($\sqrt[3]{N}$−1)

FIG. 16G

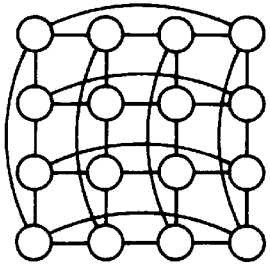

TWO-DIMENSIONAL
TORUS NETWORK
d=4, DM=2[$\sqrt{N}/2$]

FIG. 16H

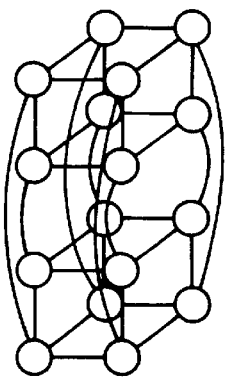

HYPERCUBE NETWORK
d=$\log_2 N$, DM=$\log_2 N$

FIG. 16I d IS THE NUMBER OF LINKS PER NODE,
DM IS DIAMETER, AND N IS THE NUMBER OF NODES

METHOD AND APPARATUS FOR ASSIGNING PRIORITY TO UPDATE DATA STORED IN PLURAL STORAGE MEANS

BACKGROUND OF THE INVENTION

The present invention relates to a method and apparatus for controlling a storage means and, more particularly, to a method and apparatus for controlling write processing when a plurality of processing means parallelly generate write requests.

In a recent communication system of an ATM (Asynchronous Transfer Mode) or the like, a plurality of data processing means such as processors perform various processing operations using external or internal storage units.

In such a system, it is important to keep matching of data among the storage units with contents related to each other when the plurality of processors parallelly issue requests for write processing in the storage units. In addition, when the plurality of data processing means are to almost simultaneously use stored data related to each other, use priorities of the data processing means must be taken into consideration, or matching of data along the time axis must be ensured. That is, when a plurality of write requests are generated, the latest data must always be preferentially overwritten.

A general parallel write control method by a plurality of data processing means for a plurality of storage units will be described below by way of some examples.

Assume counter values "0" to "3" described in tables corresponding to identifiers included in headers of communication cells such as ATM cells. For the descriptive convenience, one identifier is assumed to correspond to an index for referring to a table. The entity of this table is stored in a main storage unit outside the communication apparatus.

Every time a cell having an identifier which has not been used for internal processing yet is received by the communication apparatus at a predetermined period (period shorter than the long processing period on the host side), a duplicate of data stored in the main storage unit with an index corresponding to the identifier is stored in a storage unit in the communication apparatus and, more specifically, a cache memory. Upon completion of processing of a cell having the same identifier, the content written in the cache memory is rewritten in the main storage unit.

On the host side outside the communication apparatus, a second data processing means increments the counter values of the tables corresponding to all indices in the main storage unit by one at a predetermined period (long period). In the communication apparatus, every time a cell is received, a first data processing means loads a table corresponding to the identifier from index data in the cache memory and initializes the counter value to "0", thereby reflecting the data in the main storage unit on the cache memory.

The second data processing means independently performs write processing in the main storage unit. The first data processing means independently performs processing for the cache memory. Therefore, unless stored data having the same index are written in overlapping time periods, matching of these stored data is not degraded by write processing in the main storage unit and the cache memory.

However, the main storage unit and the cache memory have the relationship between an entity and a duplicate. When stored data having the same index are independently written in the main storage unit and the cache memory in overlapping time periods, matching of these stored data may be degraded in rewrite processing of the contents stored in the cache memory in the main storage unit.

Assume that the counter value of the table is "1", and the second data processing means increments the counter value to "2". The second data processing means refers to the table in the main storage unit to increment the counter value of the table. At this time point, the counter value of the table is still "1". The second data processing means loads the counter value "1", increments the counter value by one, and writes "2" in the table of the main storage unit.

In some cases, communication cells having identifiers representing the same index are received by the communication apparatus while the second data processing means loads the table and rewrites the counter value. If the first data processing means has initialized the counter value to "0", the counter value "2" rewritten by the second data processing means is based on the counter value "1", i.e., old data before processing by the first data processing means. For this reason, the second data processing means overwrites the counter value "2", although the counter value "1" obtained by incrementing the initialized counter value "0" by one is supposed to be rewritten, thus degrading the matching.

Such mismatching of stored data among the plurality of storage units results from the fact that the data processing means for independently performing processing for the storage units cannot perform real-time processing. Therefore, when the stored data are to be parallelly processed in almost overlapping time periods by a plurality of factors, the problem of mismatching cannot be avoided.

Conventionally, to maintain matching of stored data, two or more data processing means sequentially perform write processing in the corresponding storage units such that the processing periods of the data processing means do not overlap. When a certain data processing means is performing processing including write processing in the storage unit in the same processing block, and another independent data processing means is to perform processing including write processing in the storage unit in the self processing block, less urgent processing must wait until more urgent processing is ended.

More specifically, assume that the second data processing means for incrementing the counter by one and the first data processing means for initializing the counter value to "0" are to perform processing of table data corresponding to the same index in overlapping periods. Even when the data processing means has already started a series of processing operations from counter value load processing to counter value rewrite processing in the counter, processing performed by the second data processing means so far is canceled when the first data processing means having a high urgency level generates a request for loading the same index. After the counter value is initialized to "0" by the first data processing means, the second data processing means loads the counter value again, increments the counter value by one, and rewrites the counter value "1".

Two conventional techniques are used to ensure matching of stored data. One is called an updating scheme. When data is written in a certain storage means on the duplicate side, data in all the remaining storage means on the duplicate side and all storage means on the entity side are updated to the rewritten data.

The other technique is called an invalid scheme. When data is written in a certain storage means on the duplicate side, all the remaining storage means and all storage means on the entity side are notified of the address data of this storage area. With this processing, it is notified that data which has already been written in the storage area at the address is not the latest data, thus invalidate the data in the remaining storage means.

In the updating scheme, when one data processing means has written data in the storage area of a storage means in the same processing block, other data processing means which are going to write data in the same storage area cancel all processing operations. Processing in the storage means in the self processing block must be uselessly performed later again from the beginning.

In the invalid scheme as well, if data stored in the storage subjected to write processing or reference is invalidated, data in the storage area must be read out again to perform processing again from the beginning.

In both the above schema, write processing in the same storage area must be sequentially performed.

Conventionally, to protect matching of stored data, when two or more data processing means are to write data in the same storage area, processing of each data processing means must be sequentially performed.

However, when data stored in the same storage area is to be continuously used for a long time by a data processing means which has a high urgency level and has started processing first, a data processing means which has a low urgency level and therefore must perform processing later waits for its processing. In some cases, the data processing means with the high urgency level cannot complete processing within a predetermined time period when the data processing means with the low urgency level must perform processing.

The above-described counter in the communication table will be considered. While cells having the same index are continuously processed through a pipeline, the first data processing means continuously performs processing using stored data corresponding to the index. In this case, the second data processing means waits for processing. In some cases, the first data processing means cannot complete processing within the time limit that the second data processing means must complete processing.

Conventionally, although data written on the duplicate side is written on the entity side, data newly written on the entity side is not reflected on the duplicate side.

For example, when the first data processing means has written data in the above-described table of the cache memory in which the counter value is stored, the data can be reflected in rewriting the stored data from the cache memory side to the main storage unit side. However, in the prior art, data written by the second data processing means in the main storage unit is not reflected on the cache memory side where the data has already been cached. This causes the following disadvantages.

When cells with the same index data continuously exist at least in the pipeline, stored data which has been loaded once is continuously used without being newly read out from the main storage unit, thereby increasing the cache efficiency. Assume that a cache memory holding stored data corresponding to a certain index is continuously used for a long time. Even when the second data processing means performs processing during this period, rewrite of the stored data corresponding to the index is not reflected on the cache memory side. Therefore, the first data processing means performs processing by continuously using old stored data which has not been rewritten by the second data processing means.

In a communication control apparatus such as an ATM switching system whose development is in progress, processing associated with a cell is performed using an internal cache memory, and processing for the maintenance/operation of all lines is often performed using a main storage unit. In this situation, if the capacity of the storage area of the cache memory is increased to improve the cache efficiency, data for one line may be kept cached for a long time. Assuming that the contents which have been rewritten in the main storage unit are not reflected on the already cached stored data, as in the prior art, if line data is frequently used for cell processing, processing for the maintenance/operation of cache lines degrades matching of stored data in the cache memory which is performing cell processing.

In addition, assume that when write processing by a plurality of data processing means in the same storage area congest, processing is to be sequentially performed. If processing operations at short periods congest during a processing operation at a long period, the processing operation at the long period must wait. However, both the processing operations congest once or more at a long period, the processing operation at the long period is substantially disabled.

Assume that, processing associated with a cell is performed using the internal cache memory, and processing for the maintenance/operation of all lines is performed using the main storage unit. In this case, if a large-scale line is set, the cell arrival frequency of this line becomes high. When a line flow 1/16 that of all lines is set for a line A, a cell arrives at the line A every a 16-cell period. If processing for the maintenance/operation of all lines takes a time corresponding to the 16-cell period, a cell arrives at the line A at a very high probability for this 16-cell period, so the processing for the maintenance/operation of the line A is substantially disabled. This tendency becomes more conspicuous as the line flow increases, and the processing time for a long period increases. If the total line flow is substantially occupied by one line, maintenance/operation processing of lines is completely disabled.

SUMMARY OF THE INVENTION

It is an object of the present invention to provide a storage means control method and apparatus for allowing parallelly arranged data processing means for processing stored data to read/write a plurality of stored data without degrading matching among the stored data.

According to the present invention, there is provided a storage means control method comprising the steps of causing first processing means to perform write processing in first storage means, causing revealing data control means to manage revealing data representing storage areas where the first processing means has performed write processing in the first storage means, causing priority data control means to manage priority data representing a priority of write processing of the first processing means in units of storage areas of second storage means, causing inhibition data control means to generate and manage inhibition data for inhibiting write processing in each storage area of the second storage means using the priority data stored in the priority data control means and the revealing data managed by the revealing data control means, and causing processing data reflection means to reflect the data written in the first storage means on the second storage means on the basis of the inhibition data managed by the inhibition data control means.

According to the present invention, when different processing means are performing write processing in corresponding storage means in overlapping periods, data with a high priority can be reflected on the data stored in the respective storage means. Therefore, the contents of all the storage means can be matched in accordance with the latest data.

This method may further comprise the step of causing second processing means to perform write processing in second storage means. In addition, this method can also be applied even when the processing means and the storage means comprise first to Nth processing means and first to Nth storage means, respectively.

The method may further comprise the steps of changing with time at least one of the revealing data managed by the revealing data control means or the first, second, . . . , Nth revealing data managed by the first, second, . . . , Nth revealing data control means and the priority data managed by the priority data control means, and accordingly changing with time the inhibition data managed by the inhibition data control means.

The step of reflecting the data stored in the first storage means on the data stored in the second storage means may be performed upon completion of processing by the first processing means. Alternatively, the step of reflecting the data stored in the second, third, . . . , Nth storage means on the data stored in the first storage means by the processing data reflection means may be performed upon completion of write processing in the first storage means by the first processing means, the step of reflecting the data stored in the first, third, . . . , Nth storage means on the data stored in the second storage means by the processing data reflection means may be performed upon completion of write processing in the second storage means by the second processing means, and the step of reflecting the data stored in the first, second, . . . , (N-th) storage means on the data stored in the Nth storage means by the processing data reflection means may be performed upon completion of write processing in the Nth storage means by the Nth processing means.

The method may further comprise the step of causing the revealing data control means to accumulate and manage the first, second, . . . , Nth revealing data obtained when the first, second, . . . , Nth processing means perform processing in the first, second, . . . , Nth storage means excluding Jth storage means, respectively, before Jth processing means of the first, second, . . . , Nth processing means completes processing in the Jth storage means.

According to the present invention, there is also provided a storage means control apparatus comprising first write processing means for performing write processing in first storage means, revealing data control means for managing revealing data representing storage areas where the first write processing means has performed write processing in the first storage means, priority data control means for managing priority data representing a priority of write processing of the first write processing means in units of storage areas of second storage means, inhibition data control means for generating and managing inhibition data for inhibiting write processing in each storage area of the second storage means using the priority data managed by the priority data control means and the revealing data managed by the revealing data control means, and processing data reflection means for writing the data written in the first storage means in the second storage means on the basis of the inhibition data managed by the inhibition data control means.

This arrangement can also be applied even when the processing means and the storage means comprise first to Nth processing means and first to Nth storage means, respectively.

The apparatus may further comprise means for changing with time at least one of the revealing data managed by the revealing data control means or the first, second, . . . , Nth revealing data managed by the first, second, . . . , Nth revealing data control means and the priority data managed by the priority data control means. The inhibition data managed by the inhibition data control means may be accordingly changed with time, and the inhibition data may be changed along with a progress in processing by the processing means.

Processing of reflecting the data stored in the first storage means on the data stored in the second storage means may be performed upon completion of processing by the first processing means. Alternatively, the processing data reflection means may perform processing of reflecting the data stored in the second, third, . . . , Nth storage means on the data stored in the first storage means upon completion of write processing in the first storage means by the first processing means, processing of reflecting the data stored in the first, third, . . . , Nth storage means on the data stored in the second storage means upon completion of write processing in the second storage means by the second processing means, and processing of reflecting the data stored in the first, second, . . . , (N-th) storage means on the data stored in the Nth storage means upon completion of write processing in the Nth storage means by the Nth processing means.

The revealing data control means may accumulate and manage the first, second, . . . , Nth revealing data obtained when the first, second, . . . , Nth processing means perform processing in the first, second, . . . , Nth storage means excluding Jth storage means, respectively, before Jth processing means of the first, second, . . . , Nth processing means completes processing in the Jth storage means.

BRIEF DESCRIPTION OF THE DRAWINGS

FIG. 3 is an explanatory view showing data managed by processing unit 2 in the apparatus having three processing units so as to explain the embodiment in more detail;

FIG. 4 is an explanatory view showing data managed by processing unit 3 in the apparatus having three processing units so as to explain the embodiment in more detail;

FIG. 5 is an explanatory view showing the contents of processing data obtained by reflecting data to each other in the apparatus having three processing units;

FIG. 6 is an explanatory view showing storage areas A to H of a storage means in the apparatus having three processing units;

FIG. 9 is an explanatory view showing the contents of processing data obtained by reflecting data to each other in the apparatus having two processing units;

FIGS. 16A, 16B, 16C, 16D, 16E, 16F, 16G, 16H, and 16I are explanatory views showing the connection structure in a storage means control apparatus according to still another embodiment of the present invention.

DESCRIPTION OF THE PREFERRED EMBODIMENTS

An embodiment of the present invention will be described below with reference to the accompanying drawings.

Figure 1:
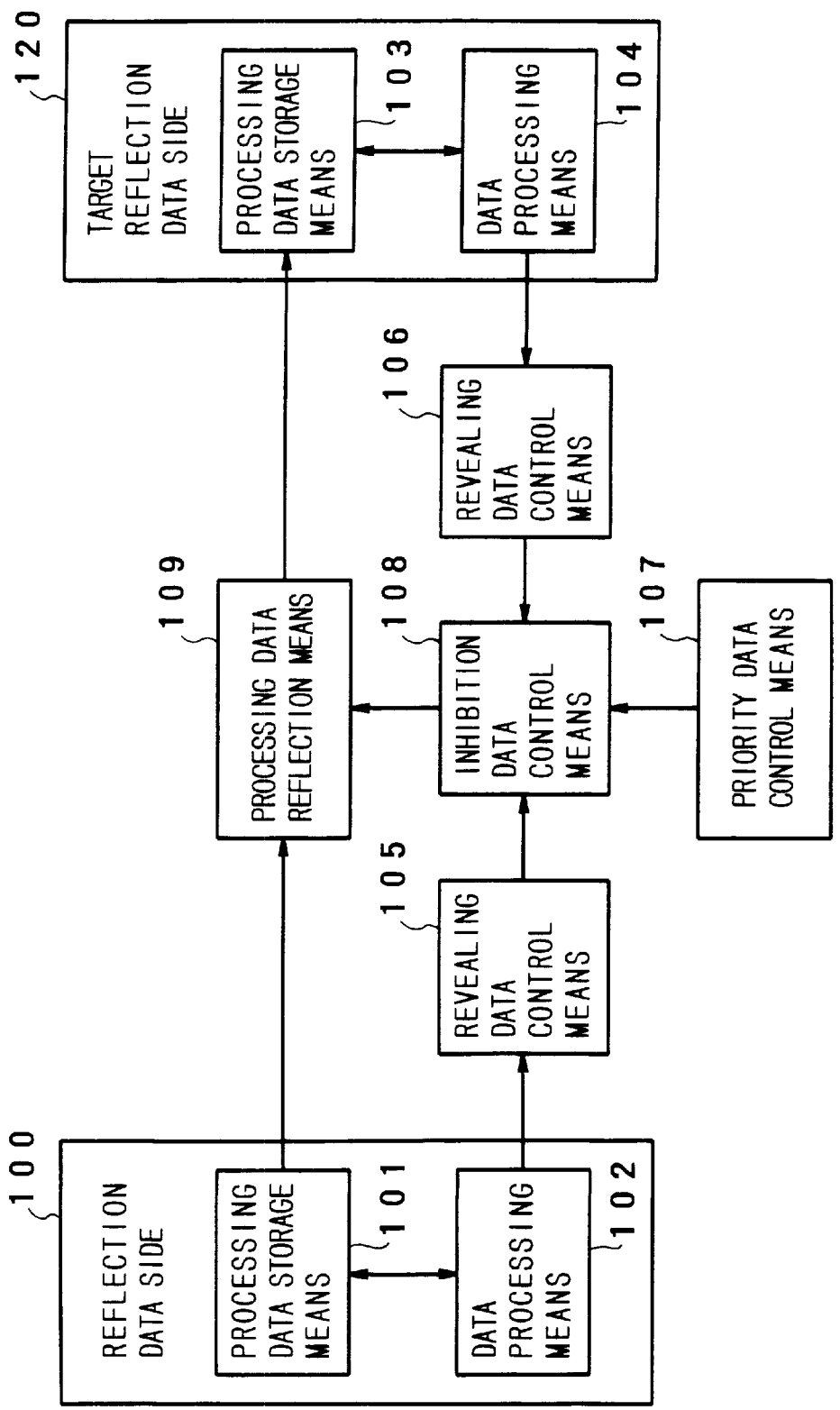
FIG. 1 is a block diagram showing the arrangement of a storage means control apparatus according to an embodiment of the present invention.

FIG. 1 shows the arrangement of a storage means control apparatus according to this embodiment. A reflection data side 100 has a processing data storage means 101 and a data processing means 102. The processing data storage means 101 corresponds to, e.g., a cache memory in a communication apparatus.

A target reflection data side 120 has a processing data storage means 103 and a data processing means 104. The processing data storage means 103 corresponds to, e.g., a main storage unit outside the communication apparatus.

Processing data stored in the processing data storage means 101 on the reflection data side 100 is read or written by the data processing means 102, and the result is written in the contents of the processing data storage means 101.

Processing data stored in the processing data storage means 103 on the target reflection data side 120 is read or written by the data processing means 104, and the result is written in the contents of the processing data storage means 103.

Write processing by the data processing means 102 in the processing data storage means 101 on the reflection data side 100, and write processing by the data processing means 104 in the processing data storage means 103 on the target reflection data side 120 are completely independently performed. If processing is required on one side, this processing is performed independently of the other side.

A revealing data control means 105 stores/manages revealing data representing a storage area or storage block where data in the processing data storage means 101 is rewritten by the data processing means 102.

A revealing data control means 106 stores/manages storage area where data in the processing data storage means 103 is rewritten by the data processing means 104.

A priority data control means 107 stores/manages priority data representing the priorities of write processing operations in each storage area of the processing data storage means 103 by the data processing means 102 and the data processing means 104.

A inhibition data control means 108 generates inhibition data representing whether stored data of the data processing means 102 can be written in the processing data stored in the processing data storage means 103 in units of storage areas of the processing data storage means 103 and stores the inhibition data. The inhibition data control means 108 retrieves revealing data for each storage area using outputs from the revealing data control means 105 and 106 in units of storage areas of the processing data storage means 103. For storage areas having revealing flags representing that rewrite processing has been performed, an open flag for enabling write processing is set for a data processing means with a high priority, and a prohibit flag is set for a data processing means with a low priority.

A processing data reflection means 109 loads processing data in the processing data storage means 101 on the reflection data side 100 first. On the basis of inhibition data output from the inhibition data control means 108, the processing data reflection means 109 performs write processing in the processing data storage means 103 only in storage areas where write processing is enabled, i.e., storage areas with set open flags for the data processing means 102.

When the reflection data side 100 and the target reflection data side 120 change places with each other, contents stored in the processing data storage means 103 can be reflected by the processing data reflection means 109 on the processing data storage means 101 on the basis of the inhibition data managed by the inhibition data control means 108.

The operation procedures of the control apparatus according to this embodiment will be described next in more detail.

For the descriptive convenience, assume that one processing unit is constituted by a processing data storage means and an associated data processing means, and a total of three processing units (processing units 1, 2, and 3) are arranged. Each processing unit has means for managing processing data, revealing data, inhibition data, and priority data. The processing units have data processing means 1, 2, and 3, respectively. The data processing means 1, 2, and 3 store/manage processing data 1, 2, and 3, respectively.

Figure 2:
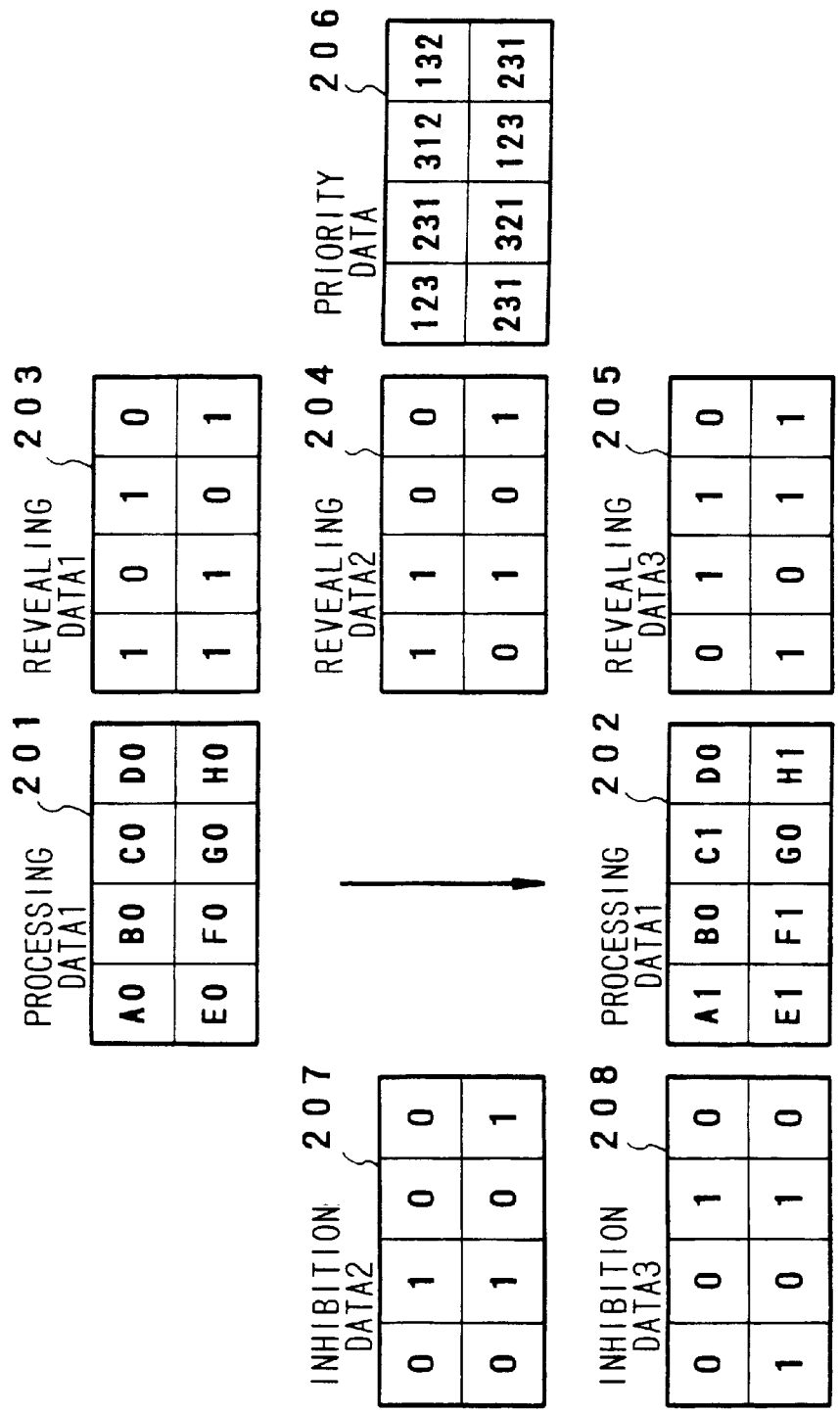
FIG. 2 is an explanatory view showing data managed by processing unit 1 in an apparatus having three processing units so as to explain the embodiment in more detail.
Figure 3:
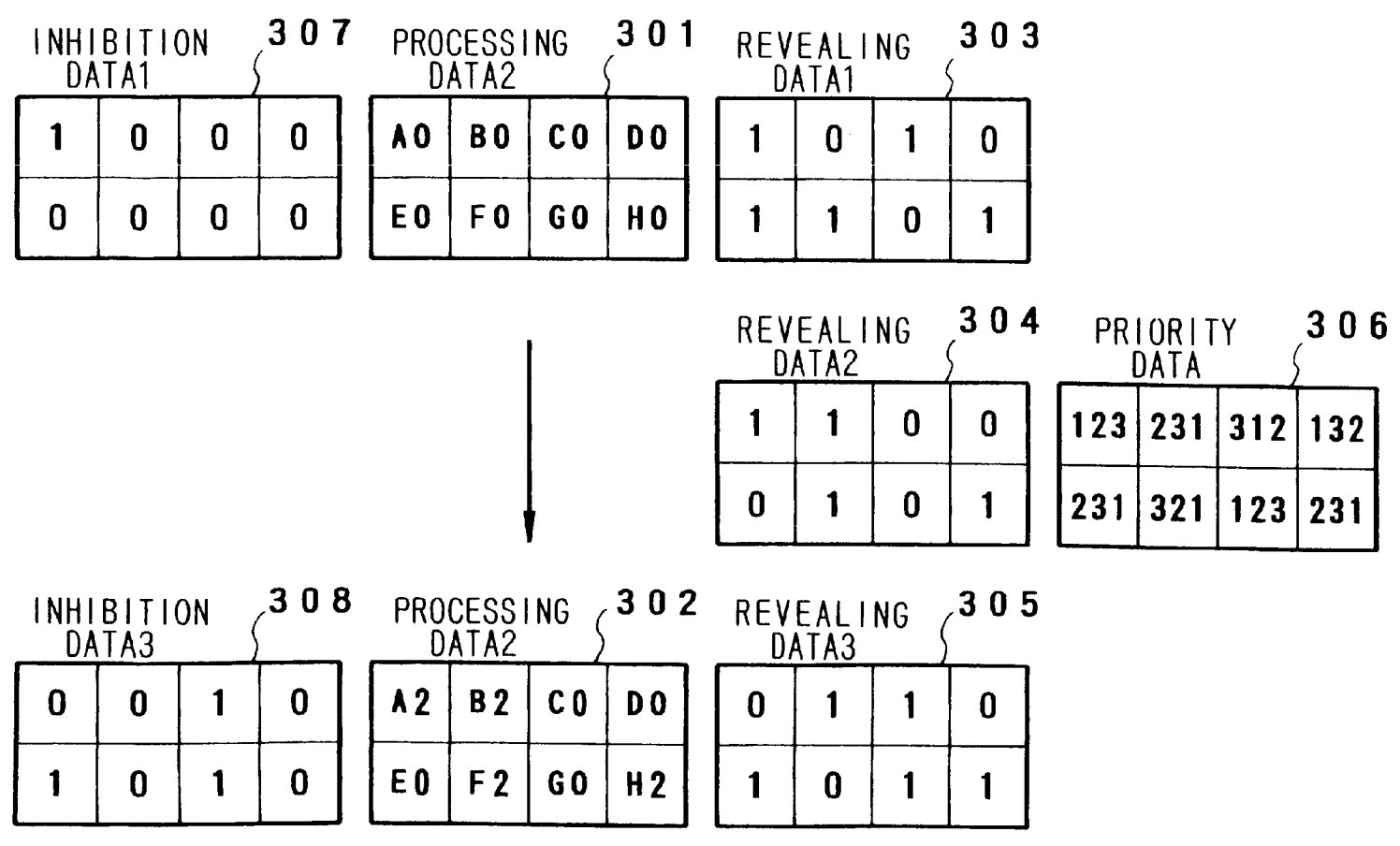
Figure 4:
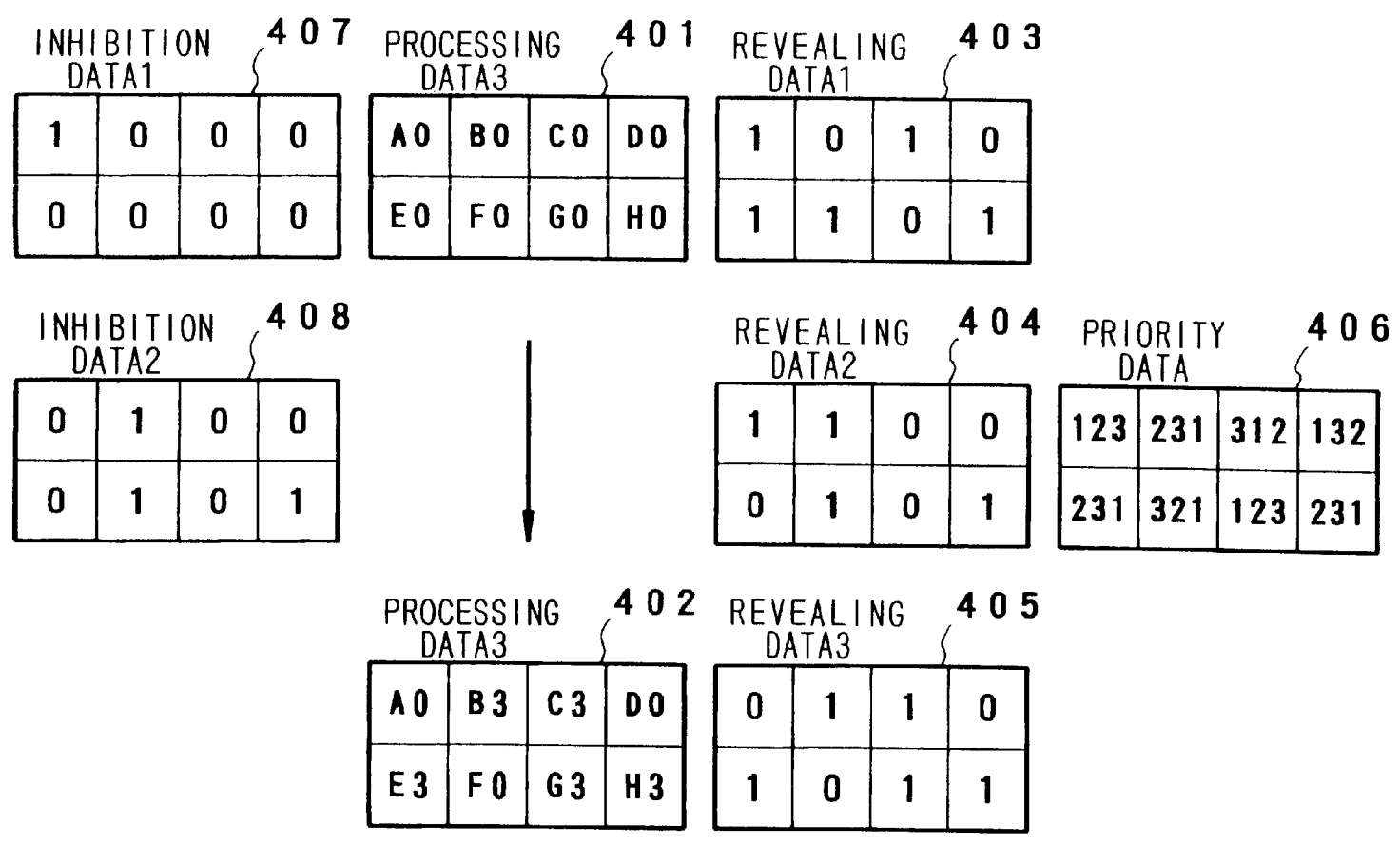

FIGS. 2, 3, and 4 show data of the processing units 1, 2, and 3. FIG. 2 shows data corresponding to the processing unit 1 in a table format, i.e., processing data 1 (201) before processing by the data processing means 1, processing data 1 (202) after processing, revealing data 1 to 3 (203 to 205), priority data (206), inhibition data 2 (207) exclusively used for the data processing means 2 as another data processing means adjacent to the data processing means 1, and inhibition data 3 (208) exclusively used for the data processing means 3.

Similarly, FIGS. 3 and 4 show data corresponding to the processing units 2 and 3, respectively. FIG. 3 shows, as data corresponding to the processing unit 2, processing data 2 (301) before processing by the data processing means 2, processing data 2 (302) after processing, revealing data 1 to 3 (303 to 305), priority data (306), inhibition data 1 (307) exclusively used for the data processing means 1, and inhibition data 3 (308) exclusively used for the data processing means 3. FIG. 4 shows, as data corresponding to processing unit 3, processing data 3 (401) before processing by the data processing means 3, processing data 3 (402) after processing, revealing data 1 to 3 (403 to 405), priority data (406), inhibition data 1 (407) exclusively used for the data processing means 3, and inhibition data 2 (408) exclusively used for the data processing means 2.

Figures 5, 6:
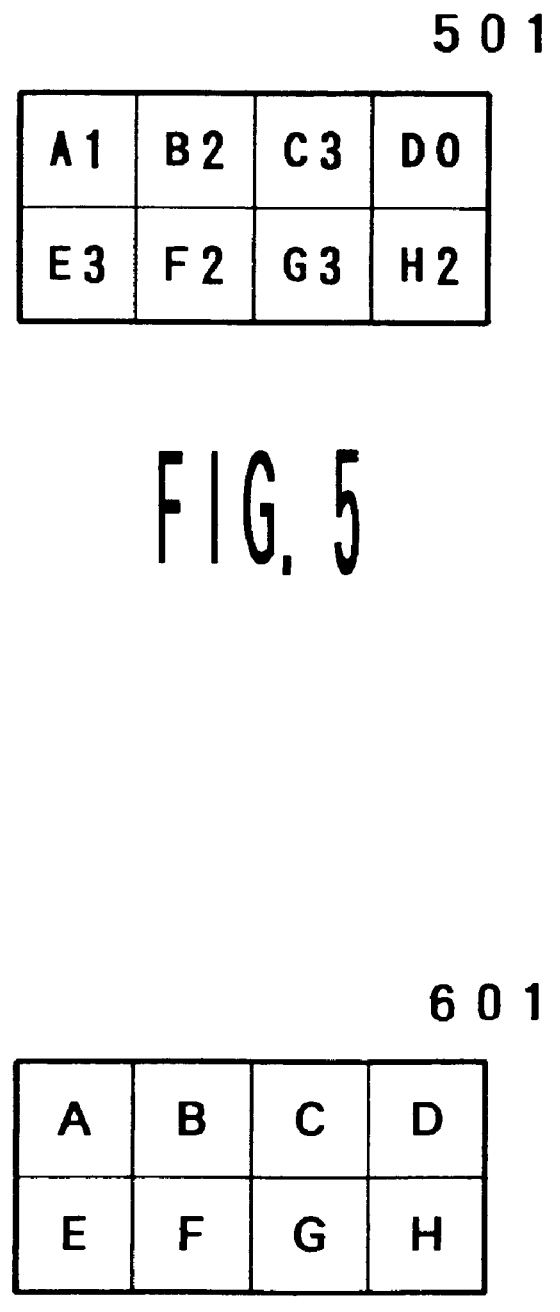

Each data is divided into eight storage areas A to H, as shown in FIG. 6. For revealing data, data of each storage area represents whether rewrite processing has been performed. For inhibition data, data of each storage area represents whether rewrite processing is enabled. Priority data has, in each storage area, priorities of contents stored in a plurality of processing data storage means, which are to be written in each area.

Assume that all data before processing by the data processing means 1, 2, and 3 are identical at a certain time point. Therefore, the storage areas A to H of each of the processing data 1 (201) to 3 (401) have identical data A0 to H0. Assume that the data processing means 1, 2, and 3 independently rewrite these identical data before processing into the processing data 1 (202) to 3 (402). The rewritten data are different from each other, as shown in FIGS. 2 to 4.

Processing by the data processing means 1 will be described first. The data processing means 1 has rewritten the processing data 1 (201) into the processing data 1 (202). At this time, data in the storage areas A, C, E, F, and H have been rewritten. Data in the areas B, D, and G have not been rewritten by the data processing means 1.

Data representing rewrite of the processing data (201) performed by the data processing means 1 is represented by the revealing data 1 (203) in units of areas. More specifically, a revealing flag "1" is set in each of the areas A, C, E, F, and H of the revealing data 1 (203) in correspondence with the storage areas where data have been rewritten. No revealing flags are set in the areas B, D, and G where data have not been rewritten, and "0" is set in these areas.

For the data processing means 2 and 3 as well, the revealing flags are set in the revealing data 2 (304) and 3 (405) in correspondence with areas where data processing means 2 and 3 have rewritten data.

In this manner, in accordance with an internal factor of each processing unit, all the processing units are informed of the revealing data (203, 304, 405) representing rewrite processing which has been performed independently of the remaining processing units. Accordingly, the revealing data of the remaining processing units can be grasped as revealing data for external factors. More specifically, the processing unit 1 can grasp the revealing data 2 (204) and 3 (205), the processing unit 2 can grasp the revealing data 1 (303) and 3 (305), and the processing unit 3 can grasp the revealing data 1 (403) and 2 (404).

Procedures for preparing inhibition data in the processing unit 1 will be described next. The data processing means 1 prepares the inhibition data 2 (207) and 3 (208) exclusively used for the external factors 2 and 3 using the revealing data 1 to 3 (203 to 205) and the priority data (206).

First, for the inhibition data 2 (207) for the data processing means 2, storage areas with revealing requests of data processing means 2, i.e., areas having revealing flags in the revealing data 2 (204) are checked. The revealing flag is set for the storage area A of the revealing data 2 (204). Next, priorities for the storage area A of the priority data 206 are referred to. The priorities for the storage area A of the priority data 206 are set in the order of the processing units 1, 2, and 3. Only the data processing means 1 has priority over the data processing means 2.

The revealing flag is set for the storage area A of the revealing data 1 (203) of data processing means 1. Accordingly, write processing by the data processing means 2 in the area A is inhibited. As a result, a prohibit flag "0" is set for the storage area A of the inhibition data 2 (207) associated with the data processing means 2.

The revealing flag "1" is set for the area B of the revealing data 2 (204) of data processing means 2. Priorities for the storage area B of the priority data 206 are set in the order of the processing units 2, 3, and 1. No data processing means have priority over the data processing means 2. Since, for the storage area B, write processing by the data processing means 2 has the highest priority, an open flag "1" is set for the storage area B of the inhibition data 2 (207).

The revealing flag "1" is set for the storage area F of the revealing data 2 (204) of the data processing means 2. Priorities for the storage area F of the priority data 206 are set in the order of the processing units 3, 2, and 1. Only the data processing means 3 have priority over the data processing means 2. No revealing flag is set for the storage area F of the revealing data 3 (205) of the data processing means 3. Therefore, for the area F, the data processing means 2 has the highest priority, and the open flag "1" is set for the storage area F of the inhibition data 2 (207).

The revealing flag "1" is set for the storage area H of the revealing data 2 (204) of the data processing means 2. Priorities for the area H of the priority data 206 are set in the order of the data processing means 2, 3, and 1. The remaining data processing means have no processing with priority over write processing by the data processing means 2.

Therefore, for the area H, the data processing means 2 has the highest priority, and the open flag "1" is set for the area B of the inhibition data 2 (207).

For the remaining storage areas with no revealing flags in the revealing data 2 (204) of the data processing means 2, i.e., for the areas C, D, E, and G, no rewrite requests from data processing means 2 are generated. Accordingly, a prohibit flag "0" is set for each of the areas C, D, E, and G.

The inhibition data 3 (208) can be prepared following the same procedures as described above. Similarly, in the remaining processing units 2 and 3 as well, the inhibition data 1 (307) and 3 (308) and the inhibition data 1 (407) and 2 (408) can be prepared.

Of storage areas with set revealing flags for all the data processing means, the open flags "1" are set only for areas of inhibition data associated with a data processing means with the highest priority, and rewrite processing is performed only in these areas.

Procedures for reflecting data in an adjacent processing unit on processing data in the self processing unit will be described next. For the processing data 1 (202), the processing data 2 (302) and 3 (402) are to be reflected on the processing data 1 (202).

First, procedures for reflecting the processing data 2 on the processing data 1 will be described. Inhibition data for the data processing means 2 corresponds to the inhibition data 2 (207). Open flags are set for three areas B, F, and H of this inhibition data. The processing data 2 (302) can be written only in these areas with set open flags.

The processing data 2 is written in areas of processing data 1 in correspondence with the areas with set open flags in the inhibition data. With this processing, data in the areas B, F, and H are rewritten from B0, F1, and H1 to B2, F2, and H2, respectively. Similarly, the processing data 3 (402) is written in areas with set open flags in the inhibition data 3 (208). Data in the areas C, E, and G, are rewritten from C1, E1, and G0 to C3, E3, and G3, respectively. When the processing data 2 (302) and 3 (402) are reflected on the processing data 1 (202) in correspondence with the areas with set open flags in the inhibition data 2 and 3, the processing data 1 is rewritten into processing data 501 shown in FIG. 5.

Even when the processing data 1 (202) and 3 (402) are reflected on the processing data 2 (302) in accordance with the inhibition data 1 and 3 following the same procedures, or the processing data 1 (202) and 2 (302) are reflected on the processing data 3 (402) on the basis of the inhibition data 1 and 2, the processing data 501 shown in FIG. 5 can be obtained.

As described above, all the processing units are informed of data which have been independently rewritten in the remaining processing units, and the rewritten data is reflected on the basis of the inhibition data prepared using the revealing data, the priority data, and the revealing data. With this processing, data with a high priority can be reflected to each other, and matching can be ensured.

The above-described embodiment corresponds to a system having three processing units. However, rewrite control can also be applied to a system having N (N is an integer: 2≦N) processing units.

Another embodiment with two processing units will be described next.

Two processing units 1 and 2 control processing of processing data 1 and 2 through data processing means 1 and 2, respectively. Each of the processing units 1 and 2 has means for storing/managing processing data, revealing data, inhibition data, and priority data.

Figure 7:
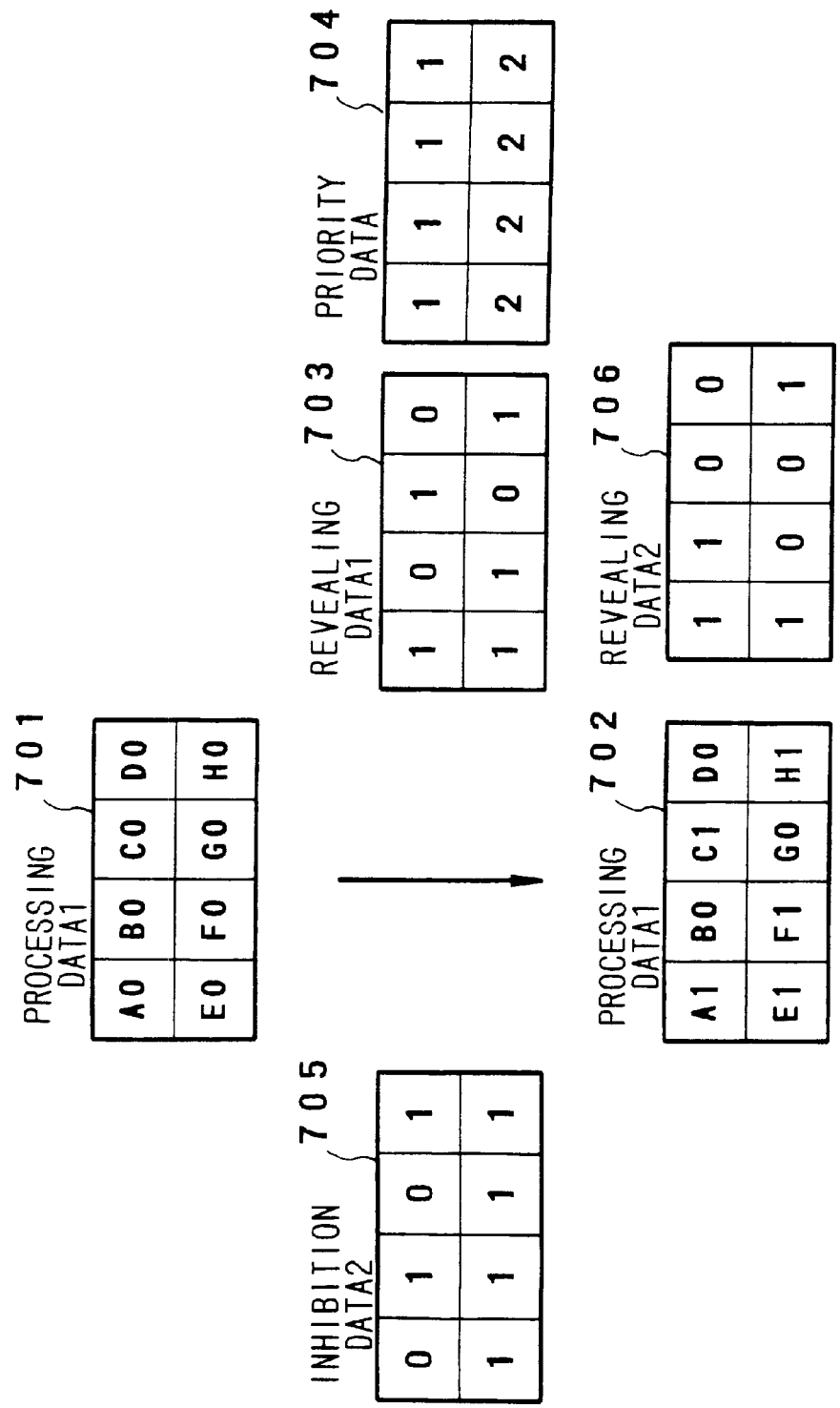
FIG. 7 is an explanatory showing data managed by processing unit 1 in an apparatus having two processing units so as to explain another embodiment of the present invention in detail.
Figure 8:
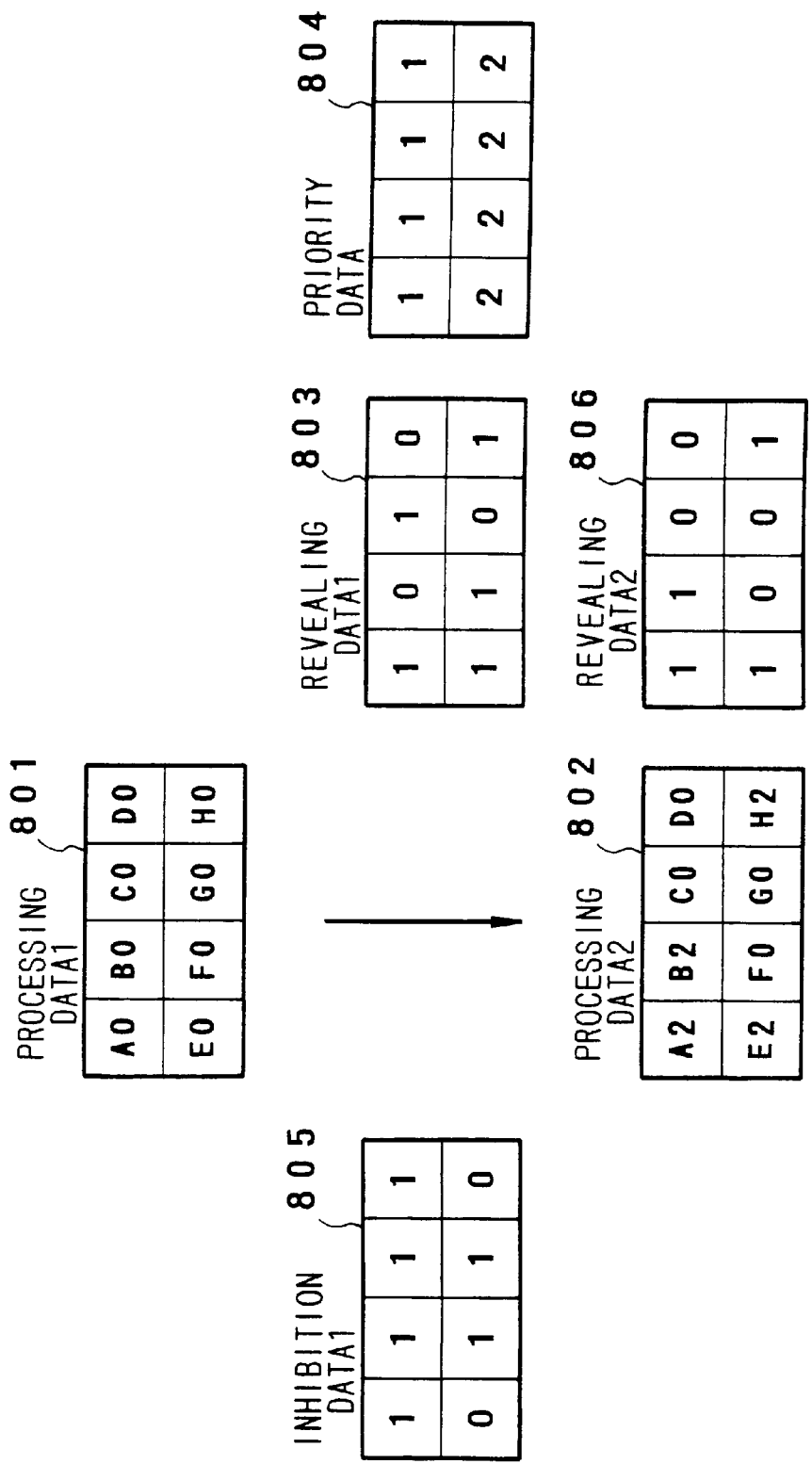
FIG. 8 is an explanatory showing data managed by processing unit 2 in the apparatus having two processing units.

FIG. 7 shows data associated with the processing unit 1. FIG. 8 shows data associated with the processing unit 2. FIG. 7 shows, in a table format, processing data 1 (701) before processing by the data processing means 1, processing data 1 (702) after processing, revealing data 1 (703), revealing data 2 (706), priority data (704), and inhibition data (705) exclusively used for the data processing means 2 corresponding to an external factor in units of storage areas.

FIG. 8 shows processing data 2 (801) before processing by the data processing means 2, processing data 2 (802) after processing, revealing data 1 (803), revealing data 2 (806), priority data (804), and inhibition data (805) exclusively used for the data processing means 1 corresponding to an external factor in units of storage areas.

As in the above-described embodiment in which three processing blocks are present, assume that data before processing by the data processing means 1 and 2 match at a certain time point. Storage areas A to H of each of the processing data 1 (701) shown in FIG. 7 and the processing data 2 (801) shown in FIG. 8 have identical data A0 to H0. Assume that the data processing means 1 and 2 independently rewrite these identical data into the processing data 1 (702) and 2 (802) different from each other, as shown in FIGS. 7 and 8.

Of data associated with the data processing means 1, the processing data 1 has been rewritten from (701) to (702). Data in the storage areas A, C, E, F, and H have been rewritten. Data in the areas B, D, and G have not been rewritten by the data processing means 1. The revealing data 1 (703) represents areas where the processing data 1 (701) has been rewritten by the data processing means 1, as shown in FIG. 7. The revealing flags "1" are set for the areas A, C, E, F, and H of the revealing data 1 (703) corresponding to the areas where rewrite processing. No flags are set for the areas B, D, and G where no rewrite processing has been performed.

Similarly, for the revealing data corresponding to storage areas where the data processing means 2 has performed rewrite processing as well, the revealing flags "1" are set for the revealing data 2 (706) managed by the processing unit 1 shown in FIG. 7 and the revealing data 2 (803) managed by the processing unit 2 shown in FIG. 8. Even in the system having two processing units, the self revealing data must be exchanged between the processing blocks.

The data processing means 1 prepares the inhibition data 2 (705) exclusively used for the external factor 2 using the revealing data (703) and the priority data (704). In storage areas with revealing requests of the data processing means 1, i.e., in the storage areas of the revealing data 1 (703), inhibition data for areas with set revealing flags are determined. The revealing flags are set for the areas A and C of the revealing data 1 (703). Priorities for the areas A and C in the priority data 704 are referred to. Since, in the areas A and C, the processing block 1 has priority over processing unit 2, the data processing means 1 has priority over the data processing means 2. Therefore, prohibit flags "0" are set for the areas A and C of the inhibition data (705) of the data processing means 2.

The revealing flags are set for the areas E, F, and H of the revealing data 1 (703) of the data processing means 1. Priorities for the areas E, F, and H in the priority data 704 are referred to. Since, in the areas E, F, and H, the processing unit 2 has priority over processing unit 1, the data processing means 2 has priority over the data processing means 1. Therefore, for the storage areas E, F, and H, the data processing means 2 has priority over the data processing means 1, and open flags "1" are set for the areas E, F, and H of the inhibition data (705).

In the remaining areas B, D, and G without set revealing flags in the revealing data 703, rewrite processing by the processing unit 1 has not been performed. Therefore, the open flag "1" is set for each of the areas B, D, and G of the inhibition data 705 of the data processing means 2. This processing is also performed in the processing unit 2, thereby generating the inhibition data 1 (805) shown in FIG. 8.

Figure 9:
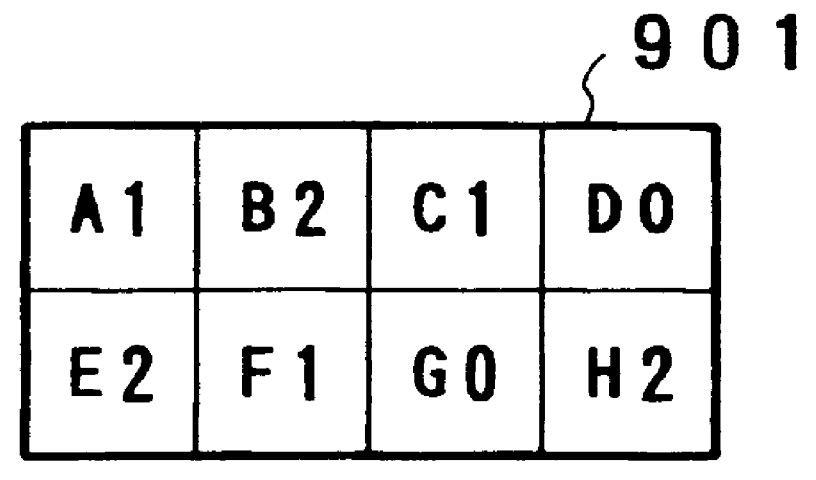

By reflecting data between the processing units 1 and 2, processing data (901) with matching can be obtained, as shown in FIG. 9.

In the above-described two embodiments, it is assumed that data are reflected at the same time point. However, reflection processing need not always be performed at the same timing in the different processing units. However, to ensure consistency of processing, reflection processing is preferably performed after the data processing means of each processing unit completes processing, or immediately before the data processing means starts next processing. In this case as well, processing by the data processing means need not be performed at the same period.

When the processing units have different processing periods, a data processing means having a short processing period performs processing a plurality of number of times when a data processing means having a long processing period is performing processing.

In this case, after the data processing means having the long period starts processing, revealing data obtained by accumulating processing operations by the data processing means having the short period is reflected, thereby ensuring matching.

Figure 10:
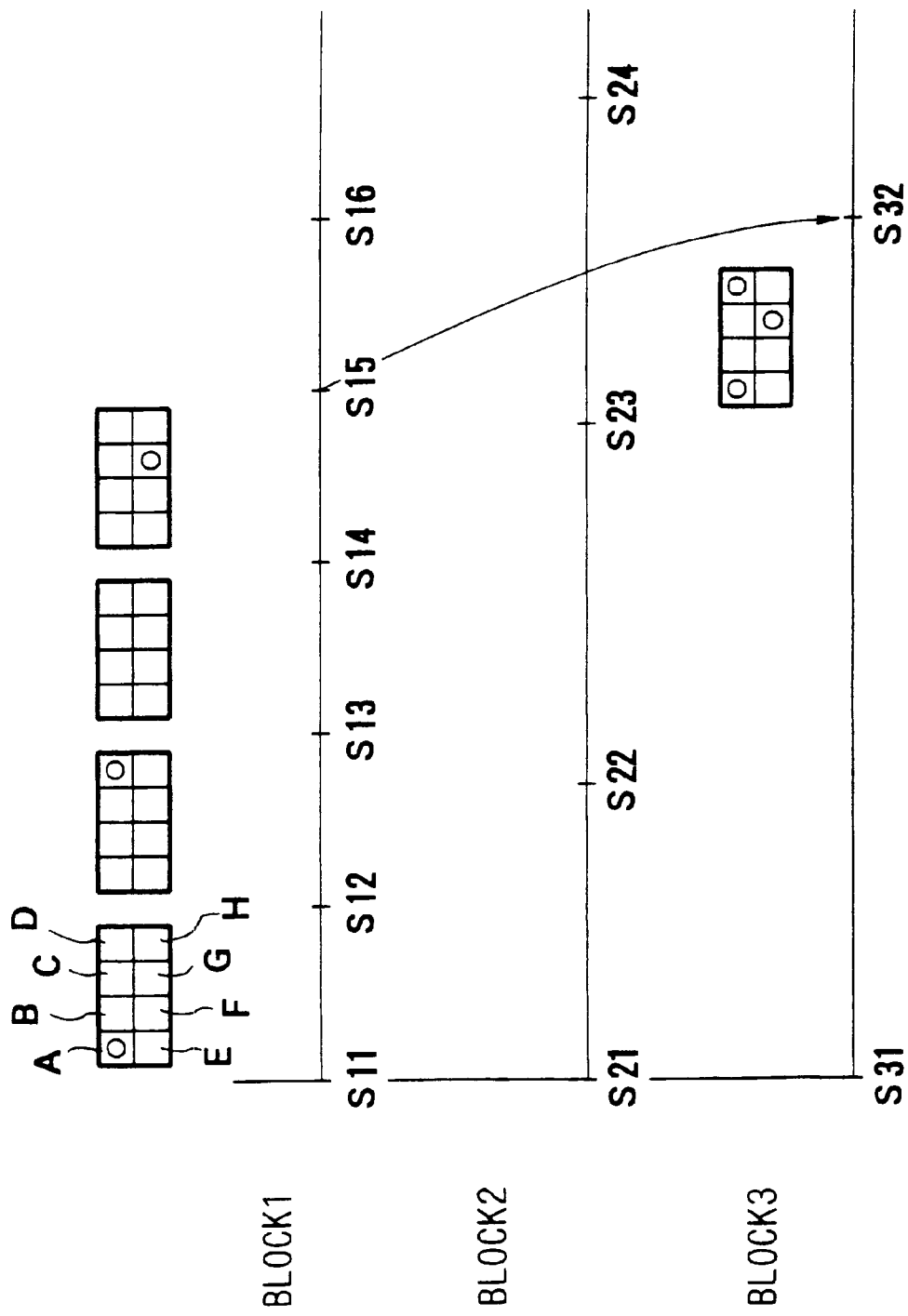
FIG. 10 is an explanatory view showing a technique of reflecting data to each other in an apparatus having three processing units with difference processing cycles.

This processing will be described with reference to FIG. 10. Assume that three processing blocks 1 to 3 are present, the processing block 1 has the shortest processing period, and the processing block 3 has the longest processing period. The processing block 1 has already completed processing in five cycles S11 to S15 for a time the processing block 3 takes to start processing in cycle S31 and complete this processing. With this processing, rewrite processing has been performed in areas A, D, and G of storage areas A to H. The processing block 3 receives, from the processing block 1, data representing that revealing flags are set for the areas A, D, and G in the processing block 1 almost at the timing of ending processing in cycle S31 and starting the next processing in cycle S32. With this processing, all revealing data can be accumulated and reflected on data stored in the self processing data storage means.

The priority data or revealing data can change along with the elapse of time, and accordingly, inhibition data may also change. In such a case, for the processing unit 1, the revealing data 1 (203) to 3 (205) and the priority data (206) shown in FIG. 2 are occasionally updated to the latest data along with the elapse of time. With this processing, the inhibition data 2 (207) and 3 (208) prepared on the basis of these data can be updated. In the apparatus shown in FIG. 1, data on the reflection data side 100 may be updated by the CPU in the communication apparatus, and data on the target reflection data side 120 may be updated by the host CPU arranged outside the communication apparatus to control the entire system.

In the embodiment shown in FIG. 1, the target reflection data side 120 has the data processing means 104, and accordingly, the revealing data control means 106 for managing revealing data associated with contents stored in the processing data storage means 103 is arranged. However, the present invention can also be applied to an arrangement shown in FIG. 11 in which a target reflection data side 120a has only a processing data storage means 103. In this embodiment, one reflection data side 100 may be arranged, or in many cases, a plurality of reflection data sides 100 are arranged. Revealing data of two or more reflection data sides 100 are exchanged, thereby writing data with a high priority on the target reflection data side 120a.

Figure 11:
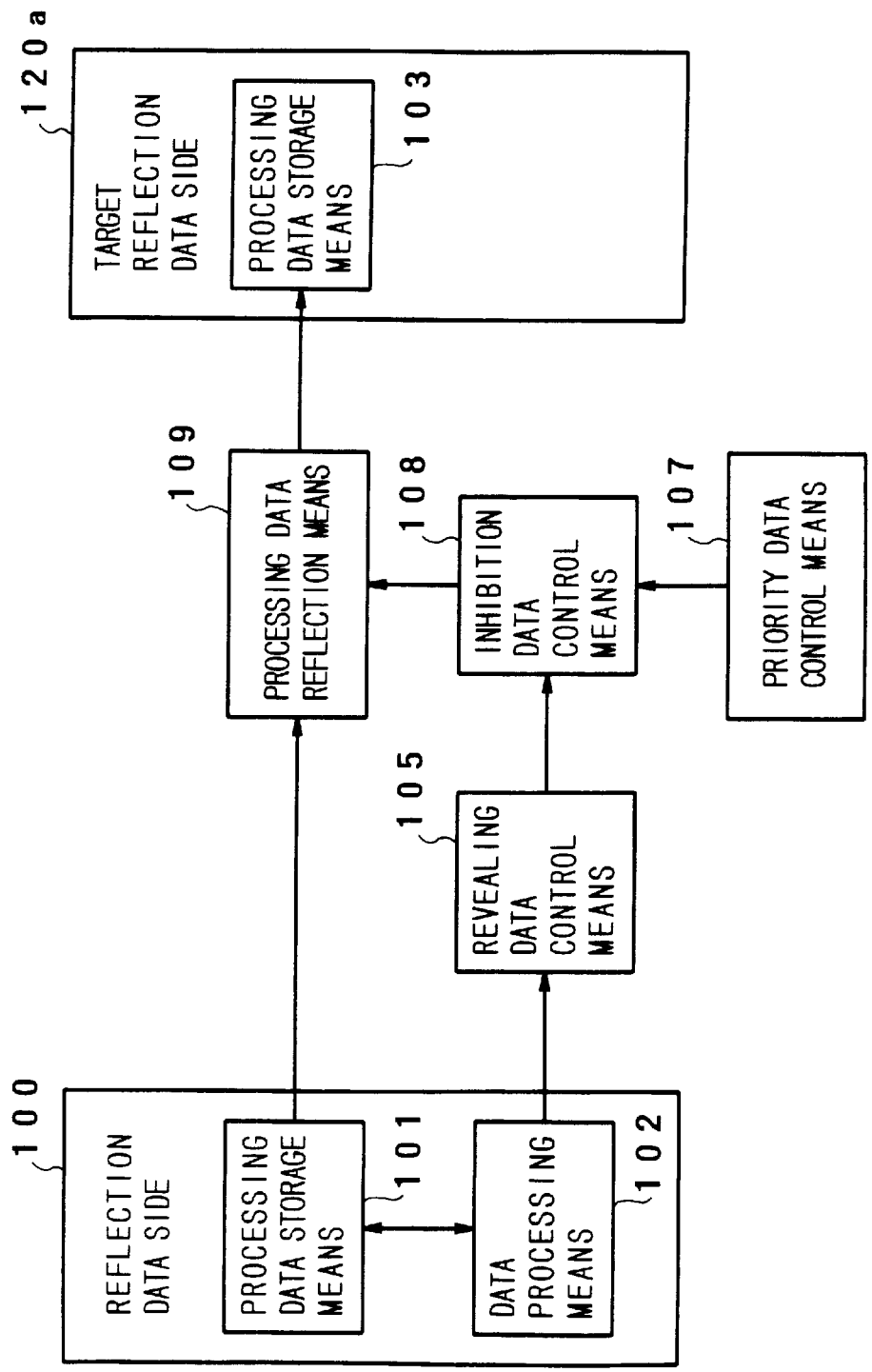
FIG. 11 is a block diagram showing the arrangement of a storage means control apparatus according to still another embodiment of the present invention.

The present invention can also be applied to an arrangement in which a plurality of target reflection data sides are arranged, and the reflection data side 100 in FIG. 1 and the target reflection data side 120a in FIG. 11 are simultaneously arranged.

In the above-described embodiments, each processing unit manages only one processing data and reflects the latest data of the remaining processing units. However, even when two or more processing data are managed by one processing unit, data of the remaining processing units can be reflected on a plurality of processing data in the self processing unit, as in the above-described embodiments.

Figure 12:
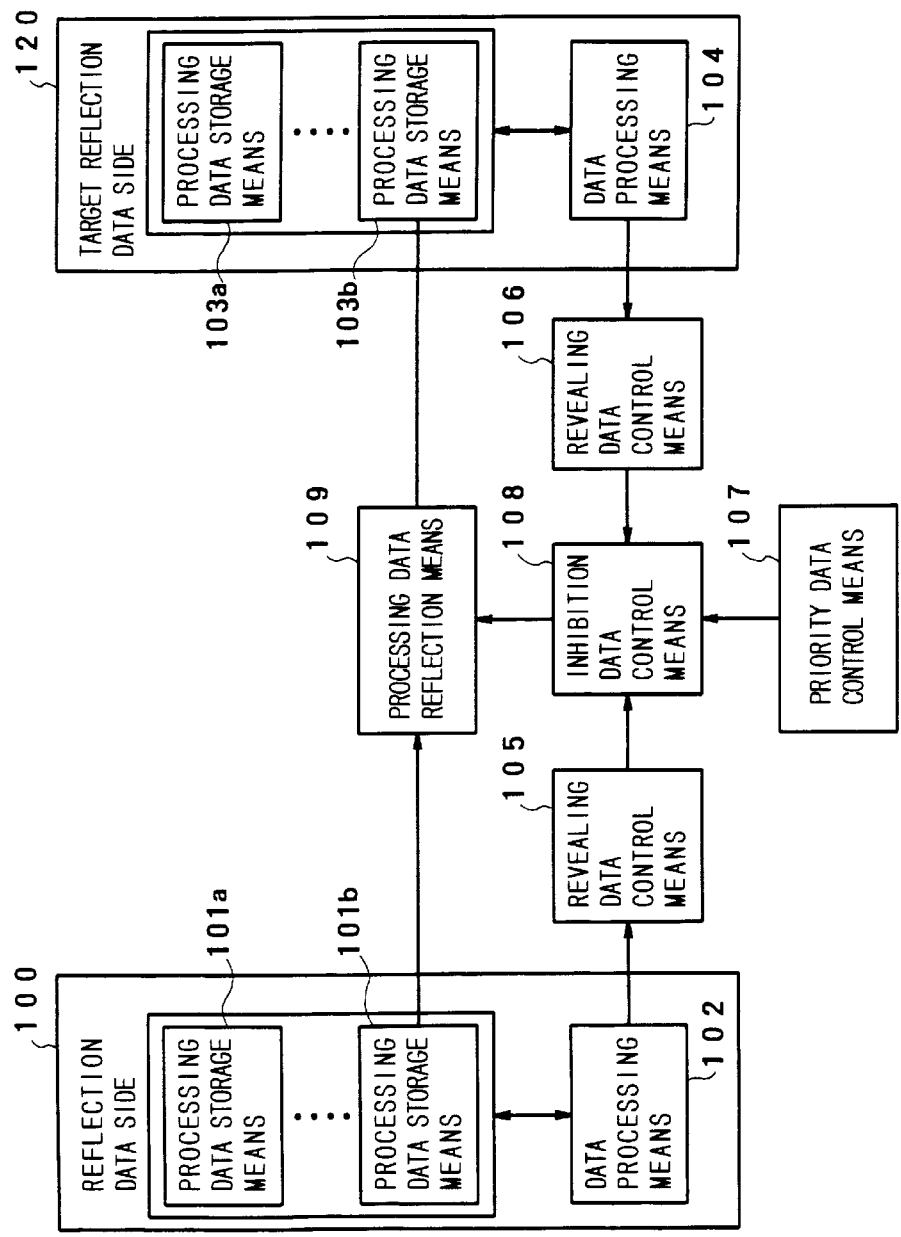
FIG. 12 is a block diagram showing the arrangement of a storage means control apparatus according to still another embodiment of the present invention.

In still another embodiment of the present invention shown in FIG. 12, a reflection data side 100 has a plurality of processing data storage means 101a, ..., 101b and one data processing means 102. The data processing means 102 performs read/write processing from/in the processing data storage means 101a, ..., 101b. A target reflection data side 120 has a plurality of processing data storage means 103a, ..., 103b and one data processing means 104. The data processing means 104 performs read/write processing from/in the processing data storage means 103a, ..., 103b. The present invention can also be applied to such an apparatus.

In the above-described embodiments, the target reflection data side has means for managing storage/rewrite of revealing data, priority data, processing data, and inhibition data. However, these means may be arranged on the reflection data side. Alternatively, instead of arranging these means on any one of the reflection data side and the target reflection data side, the means may be centralized in a neutral state.

For example, in the embodiment shown in FIG. 1, the revealing data control means 105 and 106, the priority data control means 107, the inhibition data control means 108, and the processing data reflection means 109 may be arranged on any one of the reflection data side 100 and the target reflection data side 120. Alternatively, these means may be neutralized.

Figure 13:
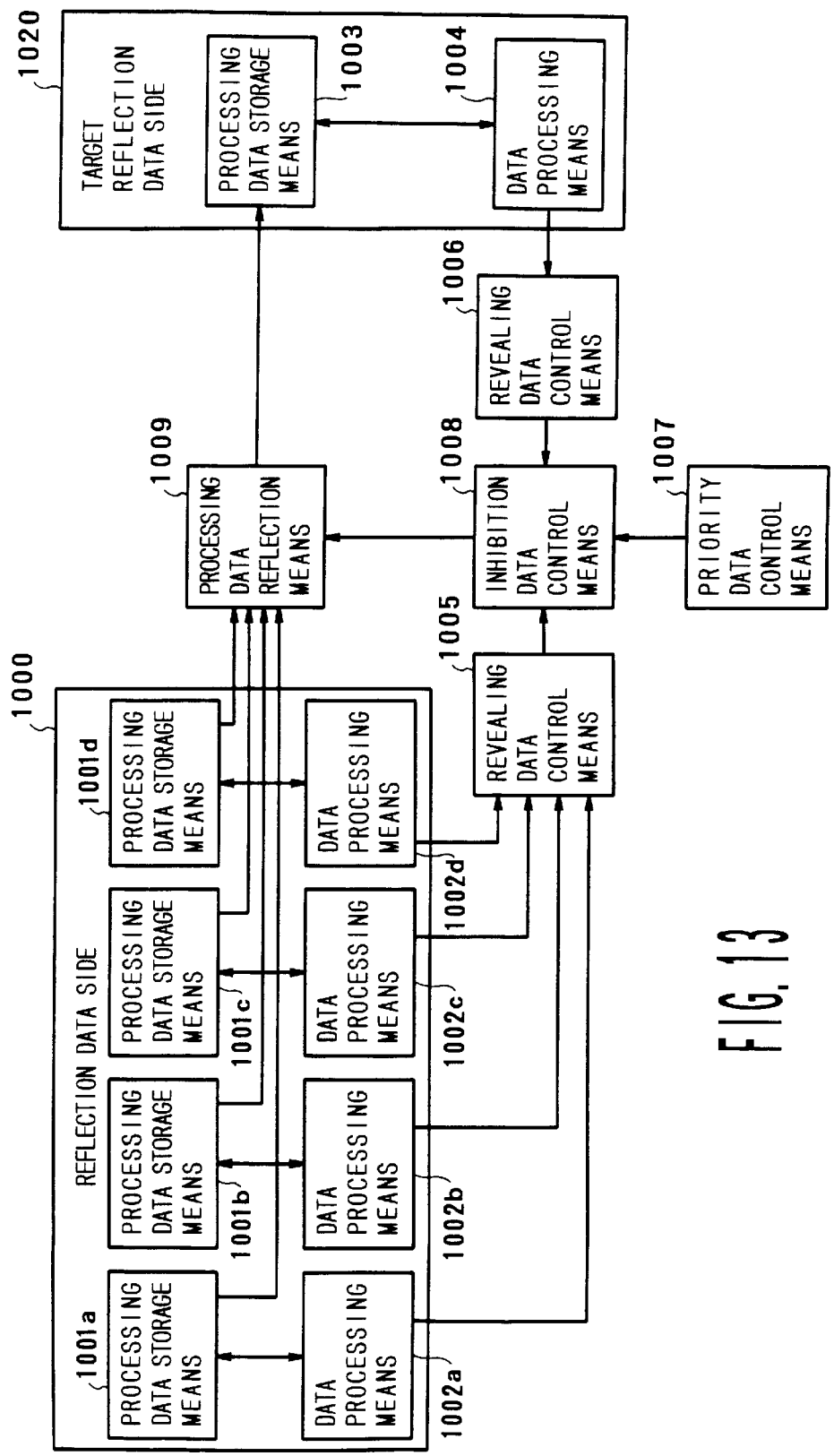
FIG. 13 is a block diagram showing the arrangement of a storage means control apparatus according to still another embodiment of the present invention.

The present invention may have the arrangement of still another embodiment shown in FIG. 13. In this embodiment, a reflection data side 1000 has a plurality of processing data storage means 1001a to 1001d and a plurality of data processing means 1002a to 1002d. The data processing means 1002a to 1002d perform read/write processing from/in the processing data storage means 1001a to 1001d, respectively. Revealing data representing storage areas where the data processing means 1002a to 1002d have rewritten data in the processing data storage means 1001a to 1001d, respectively, are stored/managed by a revealing data control means 1005.

In this embodiment as well, data rewritten in the processing data storage means 1001a to 1001d are reflected on a processing data storage means 1003 on a target reflection data side 1020 by a inhibition data control means 1008 and a processing data reflection means 1009 on the basis of priority data stored/managed by a priority data control means 1007 and revealing data stored/managed by the revealing data control means 1005.

Figure 14:
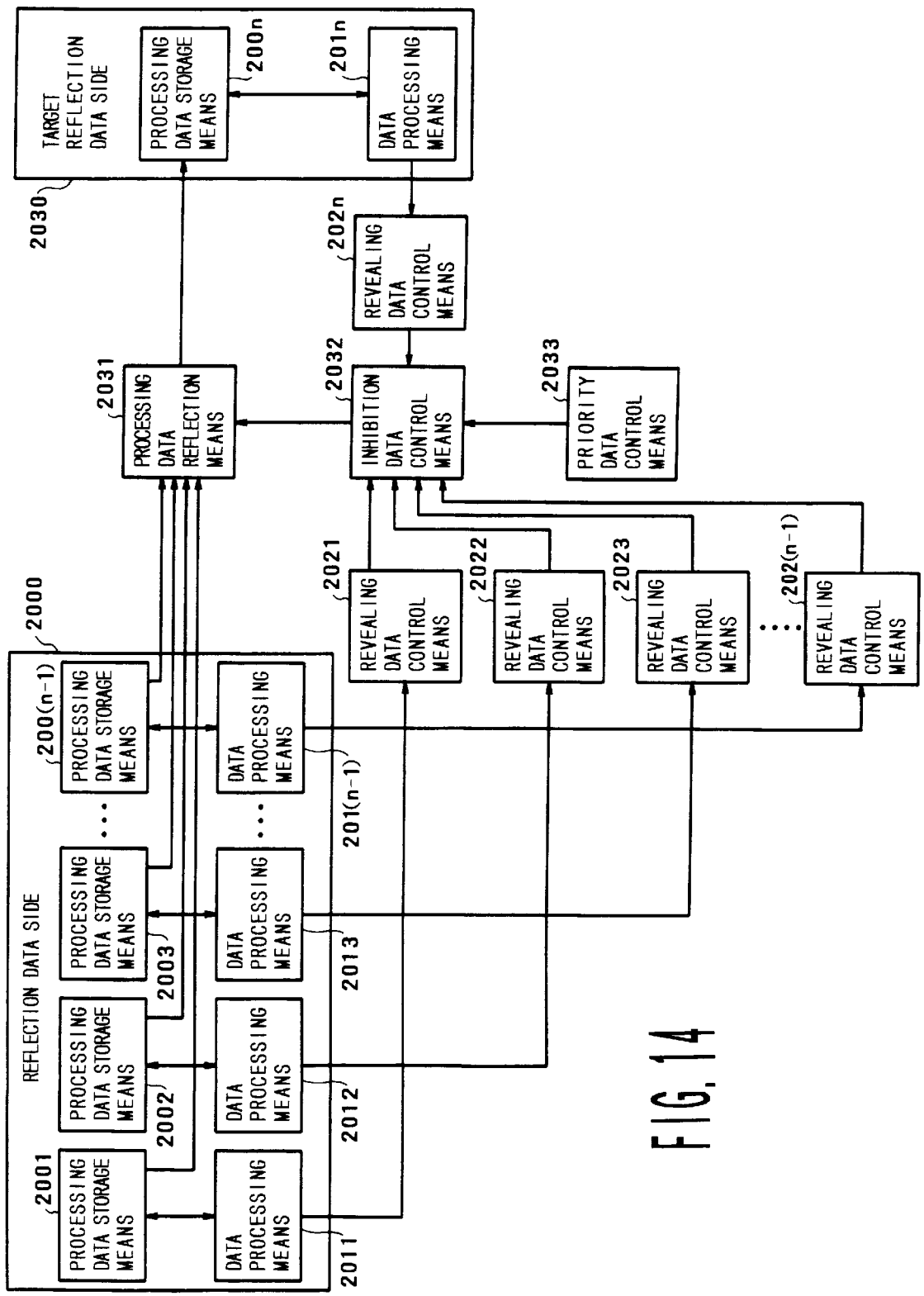
FIG. 14 is a block diagram showing the arrangement of a storage means control apparatus according to still another embodiment of the present invention.

In still another embodiment of the present invention, data is reflected between at least two of first, second, ..., nth (n is an integer: 2≦n) storage means. As shown in FIG. 14, in this embodiment, a reflection data side 2000 has n processing data storage means 2001 to 200n and n data processing means 2011 to 201n. Data stored in (n–1) processing data storage means 2001 to 200(n–1) are rewritten by data processing means 2011 to 201(n–1), respectively. Storage areas where the data have been rewritten are stored/managed by corresponding revealing data control means 2021 to 202(n–1). The inhibition data control means 2032 and the processing data reflection means 2031 reflect the data rewritten in the processing data storage means 2001 to 200(n–1) on the processing data storage means 200n on the basis of revealing data stored in the revealing data control means 2021 to 202(n–1) and priority data stored in the priority data control means 2033.

Figure 15:
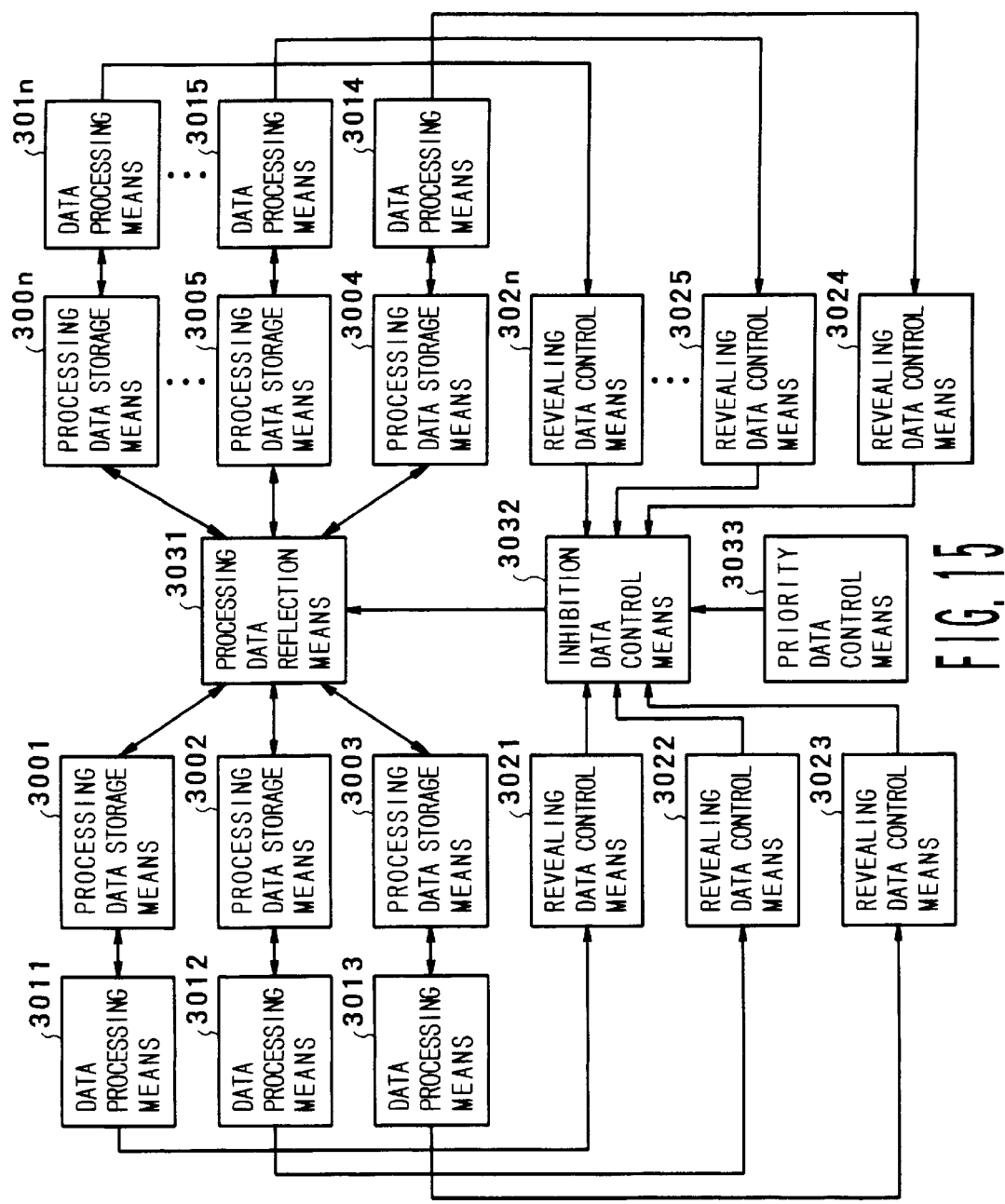
FIG. 15 is a block diagram showing the arrangement of a storage means control apparatus according to still another embodiment of the present invention.

In still another embodiment of the present invention, data stored in the first, second, ..., nth storage means are reflected among the first, second, ..., nth storage means. As shown in FIG. 15, data stored by n processing data storage means 3001 to 300n are rewritten by data processing means 3011 to 301n, respectively. Storage areas where the data have been rewritten are managed by corresponding revealing data control means 3021 to 302n. The inhibition data control means 3032 and the processing data reflection means 3031 reflect the data rewritten in the processing data storage means 3001 to 300n on data stored in the processing data storage means 3001 to 300n on the basis of the revealing data and priority data managed by the priority data control means 3033.

In the above-described embodiments, each processing unit reflects processing data on data of the remaining processing units, thus constituting a so-called complete network. However, the processing units need not always be connected with the complete network structure. For example, as shown in FIGS. 16A to 16I ("Computer Architecture", Ohm-sha, Ltd., Takanobu Baba, p. 325), as a connection structure of a plurality of processing units, a one-dimensional array network structure, a ring network structure, a three-dimensional chordal ring network structure, a two-dimensional complete network, a binary tree network, a two-dimensional mesh network, a three-dimensional mesh network, a two-dimensional torus network, or a hypercube network may be used. Alternatively, a mutual network structure having any one of topological structures, e.g., a structure by combining these structures may be used.

In addition, the processing units need not constitute a static network. Any one of dynamic networks, or a composite network constituted by a dynamic network and a static network may be used. Reflection among the units may be performed bidirectionally or unidirectionally. Reflection between certain units may be omitted. The direction of reflection among the units may be dynamically changed.

What is claimed is:

1. A storage means control method of updating data stored in first storage means on data stored in second storage means, the method comprising:

causing first processing means to perform write processing in said first storage means;

causing second processing means to perform write processing in said second storage means;

causing first tag data control means to manage first tag data representing storage areas where said first processing means has performed write processing in said first storage means;

causing second tag data control means to manage second tag data representing storage areas where said second processing means has performed write processing in said second storage means;

causing priority data control means to manage priority data representing an order in which write requests are processed of each of said first and second processing means in units of storage areas of said second storage means;

causing prevention data control means to generate and manage prevention data for preventing write processing in each storage area of said second storage means using the priority data stored in said priority data control means and the first and second tag data managed by said first and second tag data control means, respectively; and causing processing data updating means to update the data written in said first storage means on said second storage means on the basis of the prevention data managed by said prevention data control means.

2. A storage means control method of updating data among at least two of first, second, . . . , Nth (N is an integer: 2<N) storage means each storing data, the method comprising:

causing first, second, . . . , Nth processing means to perform write processing in said first, second, . . . , Nth storage means, respectively;

causing first, second, . . . , Nth tag data control means to manage first, second,. . . , Nth tag data representing storage areas where said first, second, . . . , Nth processing means have performed write processing in said first, second, . . . , Nth storage means; respectively:

causing priority data control means to manage priority data representing a an order in which write requests are processed of at least one of said first, second, . . . , Nth processing means corresponding to storage means other than at least one of said first, second, . . . , Nth storage means in units of storage areas of the at least one of said storage means;

causing prevention data control means to generate and manage prevention data for preventing write processing in each storage area of said at lest one of said storage means by said at least one of said processing means using the priority data managed by said priority data control means and the first, second, . . . , Nth tag data managed by said first, second, . . . , Nth tag data control means, respectively; and causing processing data updating means to update the data written in said at least one of said storage means on the data written in said storage means corresponding to said at least one of said processing means on the basis of the prevention data managed by said prevention data control means.

3. A method according to claim 2, further comprising the steps of changing at a later point in time at least one of the first, second, . . . , Nth tag data managed by said first, second, . . . , Nth tag data control means, respectively, and the priority data managed by said priority data control means, and accordingly changing at the later point in time the prevention data managed by said prevention data control means.

4. A method according to claim 3, wherein the step of changing at least one of the first, second, . . . , Nth tag data and the priority data comprises changing at least one of the first, second, . . . , Nth tag data and the priority data along with further processing by said first, second, . . . , Nth processing means, accordingly changing the prevention data.

5. A method according to claim 2, further comprising the step of causing said tag in data control means to accumulate and manage the first, second, . . . , Nth tag data obtained when said first, second, . . . , Nth processing means perform processing in said first, second, . . . , Nth storage means excluding Jth (J is an integer: $1 \leq J \leq N$) storage means, respectively, before the Jth processing means of the first, second, . . . , Nth processing means completes processing in said Jth storage means.

6. A storage means control method of mutually updating data stored in first, second, . . . , Nth (N is an integer: 2<N) storage means on the data stored in said first, second, . . . , nth storage means, the method comprising:

causing first, second, . . . , Nth processing means to perform write processing in said first, second, . . . , Nth storage means, respectively;

causing first, second, . . . , Nth tag data control means to manage first, second, . . . , Nth tag data representing storage areas where said first, second, . . . , Nth processing means have performed write processing in said first, second, . . . , Nth storage means, respectively;

causing priority data control means to manage priority data representing an order in which write requests are processed of each of said first, second, . . . , Nth processing means in units of storage areas of each of said first, second, . . . , Nth storage means;

causing prevention data control means to generate and manage prevention data for preventing write processing in each storage area of said first storage means by said second, third, . . . , Nth processing means, preventing write processing in each storage area of said second storage means by said first, third, . . . , Nth processing means, preventing write processing in each storage area of said third storage means by said first, second, . . . , Nth processing means, . . . , and preventing write processing in each storage area of said Nth storage means by said first, second, . . . , (N−1)th processing means, using the priority data managed by said priority data control means and the first, second, . . . , Nth tag data managed by said first, second, . . . , Nth tag data control means, respectively; and causing processing data updating means to update the data written in said second, third, . . . , Nth storage means on the data written in said first storage means, update the data written in said first, third, . . . , Nth storage means on the data written in said second storage means, update the data written in said first, second, . . . , Nth storage means on the data written in said third storage means, . . . , and update the data written in said first, second, . . . , (N−1)th storage means on the data written in said Nth storage means on the basis of the prevention data managed by said prevention data control means.

7. A method according to claim 6, wherein the step of updating the data stored in said second, third, . . . , Nth storage means on the data stored in said first storage means upon completion of write processing in said first storage means by said first processing means, the step of updating the data stored in said first, third, . . . , Nth storage means on the data stored in said second storage means by said processing data updating means is performed upon completion of write processing in said second storage means by said second processing means, and the step of updating the data stored in said first, second, . . . , (N−1)th storage means on the data stored in said Nth storage means by said processing data reflection means is performed upon completion of write processing in said Nth storage means by said Nth processing means.

8. A storage means control apparatus for updating data stored in first storage means on data stored in second storage means, comprising:

first write processing means for performing write processing in said first storage means;

second write processing means for performing write processing in said second storage means;

first tag data control means for managing first tag data representing storage areas where said first processing means has performed write processing in said first storage means;

second tag data control means for managing second tag data representing storage areas where said second processing means has performed write processing in said second storage means;

priority data control means for managing priority data representing an order in which write requests are processed of each of said first and second processing means in units of storage areas of said second storage means;

prevention data control means for generating and managing prevention data for preventing write processing in each storage area of said second storage means using the priority data managed by said priority data control means and the first and second tag data managed by said first and second tag data control means, respectively; and processing data updating means for writing the data written in said first storage means in said second storage means on the basis of the prevention data managed by said prevention data control means.

9. A storage means control apparatus for updating data among at least two of first, second, . . . , Nth storage means each storing data, comprising:

first, second, . . . , Nth processing means for performing write processing in said first, second, . . . , Nth storage means, respectively;

first, second, . . . , Nth tag data control means for managing first, second, . . . , Nth tag data representing storage areas where said first, second, . . . , Nth processing means have performed write processing in said first, second, . . . , Nth storage means; respectively;

priority data control means for managing priority data representing an order in which write requests are processed of at least one of said first, second, . . . , Nth processing means corresponding to storage means other than at least one of said first, second, . . . , Nth storage means in units of storage areas of the at least one of said storage means;

prevention data control means for generating and managing prevention data for preventing write processing in each storage area of said at lest one of said storage means by said at least one of said processing means using the priority data managed by said priority data control means and the first, second, . . . , Nth tag data managed by said first, second, . . . , Nth tag data control means, respectively; and processing data updating means for updating the data written in said at least one of said storage means on the data written in said storage means corresponding to said at least one of said processing means on the basis of the prevention data managed by said prevention data control means.

10. An apparatus according to claim 9, further comprising means for changing at a later point in time at least one of the first, second, . . . , Nth tag data managed by said first, second, . . . , Nth tag data control means, respectively, and the priority data managed by said priority data control means, and wherein the prevention data managed by said prevention data control means is accordingly changed at a later point in time.

11. An apparatus according to claim 10, wherein said means for changing at least one of the first, second, . . . , Nth tag data and the priority data changes at least one of the first, second, . . . , Nth tag data and the priority data along with further processing by said first, second, . . . , Nth processing means, accordingly changes the prevention data.

12. An apparatus according to claim 9, wherein said tag data control means accumulates and manages the first, second, . . . , Nth tag data obtained when said first, second, . . . , Nth processing means perform processing in said first, second, . . . , Nth storage means excluding Jth (J is an integer: 1≦J≦N) storage means, respectively, before the Jth processing means of the first, second, . . . , Nth processing means completes processing in said Jth storage means.

13. A storage means control apparatus for mutually updating data stored in first, second, . . . , Nth storage means on the data stored in said first, second, . . . , Nth storage means, comprising the steps of:

first, second, . . . , Nth processing means for performing write processing in said first, second, . . . , Nth storage means, respectively:

first, second, . . . , Nth tag data control means for managing first, second, . . . , Nth tag data representing storage areas where said first, second, . . . , Nth processing means have performed write processing in said first, second, . . . , Nth storage means, respectively:

priority data control means for managing priority data representing an order in which write requests are processed of each of said first, second, . . . , Nth processing means in units of storage areas of each of said first, second, . . . , Nth storage means;

prevention data control means for generating and managing prevention data for preventing write processing in each storage area of said first storage means by said second, third, . . . , Nth processing means, preventing write processing in each storage area of said second storage means by said first, third, . . . , Nth processing means, preventing write processing in each storage area of said third storage means by said first, second, . . . , Nth processing means, . . . , and preventing write processing in each storage area of said Nth storage means by said first, second, . . . , (N−1)th processing means, using the priority data managed by said priority data control means and the first, second, . . . , Nth tag data managed by said first, second, . . . , Nth tag data control means, respectively; and processing data updating means for updating the data written in said second, third, . . . , Nth storage means on the data written in said first storage means, updating the data written in said first, third, . . . , Nth storage means on the data written in said second storage means, updating the data written in said first, second, . . . , Nth storage means on the data written in said third storage means, . . . , and updating the data written in said first, second, . . . , (N−1)th storage means on the data written in said Nth storage means on the basis of the prevention data managed by said prevention data control means.

14. An apparatus according to claim 13, wherein said processing data updating means performs processing of updating the data stored in said second, third, . . . , Nth storage means on the data stored in said first storage means upon completion of write processing in said first storage means by said first processing means, processing of updating the data stored in said first, third, . . . , Nth storage means on the data stored in said second storage means upon completion of write processing in said second storage means by said second processing means, and processing of updating the data stored in said first, second, . . . , (N−1)th storage means on the data stored in said Nth storage means upon completion of write processing in said Nth storage means by said Nth processing means.

* * * * *